(12) United States Patent
Smith et al.

(10) Patent No.: US 11,260,982 B2
(45) Date of Patent: Mar. 1, 2022

(54) CRASH LOAD ATTENUATOR FOR WATER DITCHING AND FLOATATION

(71) Applicant: TEXTRON INNOVATIONS INC., Providence, RI (US)

(72) Inventors: Michael R. Smith, Colleyville, TX (US); Cheng-Ho Tho, Colleyville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 264 days.

(21) Appl. No.: 16/297,179

(22) Filed: Mar. 8, 2019

(65) Prior Publication Data

US 2019/0202570 A1 Jul. 4, 2019

Related U.S. Application Data

(63) Continuation-in-part of application No. 13/840,911, filed on Mar. 15, 2013, now abandoned, which is a
(Continued)

(51) Int. Cl.
*B64C 25/56* (2006.01)
*B64D 25/00* (2006.01)
(Continued)

(52) U.S. Cl.
CPC .............. *B64D 25/00* (2013.01); *B64C 25/56* (2013.01); *B64C 25/58* (2013.01); *B64D 45/00* (2013.01); *B64D 2045/008* (2013.01)

(58) Field of Classification Search
CPC ........ B64D 25/00; B64D 45/00; B64C 25/56; B64C 25/58
See application file for complete search history.

(56) References Cited

U.S. PATENT DOCUMENTS

| 1,776,865 A | 9/1930 | Salisbury |
| 1,787,976 A | 1/1931 | Evensen |

(Continued)

FOREIGN PATENT DOCUMENTS

| CA | 2538477 A1 | 5/2006 |
| EP | 2778067 A1 | 9/2014 |
| GB | 2457719 A | 8/2009 |

OTHER PUBLICATIONS

European Patent Office, Partial European Search Report for EP Appl. No. 13187447.1 dated Apr. 23, 2014, 4 pp.
(Continued)

*Primary Examiner* — Philip J Bonzell
(74) *Attorney, Agent, or Firm* — Edwin S. Flores; Daniel J. Chalker; Chalker Flores, LLP

(57) ABSTRACT

An apparatus comprising a float bag comprising an air bladder configured to inflate when an aircraft lands in the water, a girt coupled to the air bladder and configured to attach the air bladder to the aircraft via at least one airframe fitting, and a load attenuator coupled to the girt and configured to be positioned between the girt and the airframe fitting when the float bag is attached to the aircraft, wherein the plurality of load attenuators are configured to mechanically deform in a progressive failure fashion from a first effective length to a second effective length greater than the first length in response to an applied tensile load on the load attenuators coupled to the plurality of girts and the aircraft airframe, wherein the load attenuators are selected to reduce the force with a total length that minimizes buoyancy depth of the aircraft.

12 Claims, 10 Drawing Sheets

Related U.S. Application Data continuation-in-part of application No. 13/787,087, filed on Mar. 6, 2013, now abandoned.

(51) Int. Cl.
  *B64D 45/00* (2006.01)
  *B64C 25/58* (2006.01)

(56) References Cited

U.S. PATENT DOCUMENTS

| | | |
|---|---|---|
| 1,818,597 A | 8/1931 | Adams et al. |
| 2,508,800 A | 5/1950 | Rinne |
| 2,892,434 A | 6/1959 | Ralleo et al. |
| 2,955,785 A | 10/1960 | Smith |
| 3,154,270 A | 10/1964 | Jensen |
| 3,444,957 A | 5/1969 | Ervin, Jr. |
| 3,506,222 A | 4/1970 | Anderson |
| 3,563,498 A | 2/1971 | Haile |
| 3,861,744 A | 1/1975 | Yamada et al. |
| 3,937,407 A | 2/1976 | Matsuo |
| 4,165,059 A | 8/1979 | Summer |
| 4,451,016 A | 5/1984 | Genovese |
| 4,606,441 A | 8/1986 | Markov |
| 4,655,415 A | 4/1987 | Miller et al. |
| 4,843,992 A | 7/1989 | Babikian |
| 5,050,906 A | 9/1991 | Kneip |
| 5,529,343 A | 6/1996 | Klink |
| 5,803,439 A | 9/1998 | Gilmore |
| 5,927,646 A | 7/1999 | Sandy et al. |
| 6,220,547 B1 | 4/2001 | Smith et al. |
| 6,347,970 B1 | 2/2002 | Weinel |
| 6,644,592 B2 | 11/2003 | Parrott et al. |
| 6,709,305 B2 | 3/2004 | Parrott et al. |
| 7,156,033 B2 | 1/2007 | Mears et al. |
| 7,448,577 B2 | 11/2008 | Sadeck |
| 7,721,667 B2 | 5/2010 | Kaemmerling |
| 7,878,450 B2 | 2/2011 | Bravo et al. |
| 8,181,422 B2 | 5/2012 | Barland et al. |
| 9,004,400 B2 | 4/2015 | Certain et al. |
| 2010/0044506 A1 | 2/2010 | Smith et al. |
| 2011/0276232 A1* | 11/2011 | Filias ............... B64C 25/56 701/45 |
| 2012/0132741 A1 | 5/2012 | Certain et al. |
| 2012/0312215 A1 | 12/2012 | Lyons |
| 2013/0033056 A1 | 2/2013 | Tunis, III et al. |
| 2013/0327890 A1* | 12/2013 | Lyons ............... B64C 27/006 244/107 |
| 2014/0252165 A1 | 9/2014 | Smith et al. |
| 2014/0252166 A1 | 9/2014 | Smith et al. |

OTHER PUBLICATIONS

European Patent Office, Communication pursuant to Article 94(3) EPC for EP Appl. No. 13187447.1 dated May 13, 2014, 6 pp.
European Patent Office, Communication pursuant to Article 94(3) EPC for EP Appl. No. 13187447.1 dated Nov. 26, 2014, 3 pp.
European Patent Office, Communication pursuant to Article 94(3) EPC for EP Appl. No. 13187447.1 dated Feb. 16, 2015, 2 pp.

* cited by examiner

CRASH LOAD ATTENUATOR FOR WATER DITCHING AND FLOATATION

CROSS-REFERENCE TO RELATED APPLICATIONS

This application claims priority to and is a continuation-in-part of U.S. patent application Ser. No. 13/840,911 filed Mar. 15, 2013, which is a continuation-in-part of U.S. patent application Ser. No. 13/787,087 filed Mar. 6, 2013 by Smith et al. and entitled "Crash Load Attenuator for Water Ditching and Floatation", which are incorporated herein by reference as if reproduced in its entirety.

TECHNICAL FIELD OF THE INVENTION

The present invention relates in general to the field of crash load attenuators for water ditching and floatation.

STATEMENT OF FEDERALLY FUNDED RESEARCH

Not applicable.

BACKGROUND OF THE INVENTION

Without limiting the scope of the invention, its background is described in connection with aircraft floatation devices.

Aircraft may be forced to make an emergency landing in water. In some cases, the aircraft may be equipped with inflatable devices, for example, float bags. The float bags may be inflated prior to, simultaneous with, or subsequent to the aircraft landing in water. The structure of the aircraft may be designed to withstand the force of the landing on the float bags.

SUMMARY OF THE INVENTION

In one embodiment, the present invention includes an aircraft flotation device comprising: an air bladder in a deflated state configured to be attached to an aircraft airframe, the air bladder configured to inflate in response to an impact of the aircraft flotation device with water; one or more girts coupled to the air bladder; and one or more load attenuators having a first and a second end, wherein a first end of the one or more load attenuators is coupled to the one or more girts coupled to the air bladder, and the second end of the one or more load attenuators is attached to the aircraft airframe, wherein the one or more load attenuators are configured to mechanically deform in a progressive failure fashion from a first effective length to a second effective length greater than a first length in response to an applied tensile load between the air bladder and the aircraft airframe, wherein the one or more load attenuators are selected to reduce a force and a total length minimizes buoyancy depth of the aircraft. In one aspect, each of the one or more load attenuators comprises a textile load attenuator comprising a fold of fabric sewn with stitching, wherein the stitching is configured to break and is configured to unfold in response to the impact. In another aspect, a stroke displacement of the one or more load attenuators is from 4 to 60 centimeters. In another aspect, the one or more load attenuators comprise a frangible load attenuator comprising frangible material and non-frangible material, wherein the non-frangible material is configured to shear the frangible material in response to the impact. In another aspect, the aircraft flotation further comprises one or more sensors configured to detect the impact of the aircraft with water. In another aspect, the one or more load attenuators is selected from at least one of a textile load, a mechanical, a frangible, a stitch-rip, a T-shaped, a Z-shaped, or a tear webbing load attenuator. In another aspect, the air bladder is configured to attach to the airframe or a landing gear.

In one embodiment, the present invention includes an apparatus comprising: a float bag comprising an air bladder configured to inflate when an aircraft lands in water; one or more girt coupled to the air bladder and configured to attach the air bladder to the aircraft via at least one airframe fitting; and one or more load attenuators coupled to the girt and configured to be positioned between the girt and the airframe fitting when the float bag is attached to the aircraft, wherein the one or more load attenuators are configured to mechanically deform in a progressive failure fashion from a first effective length to a second effective length greater than a first length in response to an applied tensile load on the load attenuators coupled to the one or more girts and an aircraft airframe, wherein the load attenuators are selected to reduce a force with a total length that minimizes buoyancy depth of the aircraft. In another aspect, each of the one or more load attenuators in the one or more load attenuators comprises a textile load attenuator comprising a fold of fabric sewn with stitching, wherein the stitching is configured to break and is configured to unfold in response to an impact. In another aspect, a stroke displacement of the one or more load attenuators is from 4 to 60 centimeters. In another aspect, the one or more load attenuators comprises a frangible load attenuator comprising frangible material and non-frangible material, wherein the non-frangible material is configured to shear the frangible material in response to an impact. In another aspect, the apparatus further comprises one or more sensors configured to detect an impact of the aircraft with water. In another aspect, the one or more load attenuators is selected from at least one of a textile load, a mechanical, a frangible, a stitch-rip, a T-shaped, a Z-shaped, or a tear webbing load attenuator. In another aspect, the float bag is configured to attach to the airframe or a landing gear.

In one embodiment, the present invention includes a method comprising: selecting a sea state and an aircraft; sizing at least one float bag with one or more girts for the aircraft; and selecting one or more load attenuators positioned between the aircraft and the float bag, wherein the one or more load attenuators are configured to mechanically deform in a progressive failure fashion from a first length to a second length greater than the first length in response to an applied tensile load on the load attenuators coupled to the one or more girts and the aircraft airframe, wherein the one or more load attenuators are selected to reduce a force on the aircraft upon an impact in water and wherein the one or more load attenuators have a total length that minimizes buoyancy depth of the aircraft. In one aspect, the method further comprises selecting comprises analyzing characteristics of an aircraft and expected sea states. In another aspect, the method further comprises selecting comprises determining a peak retention load of the float bag during a water landing of the aircraft. In another aspect, a weight of an airframe of the aircraft upon selecting the one or more load attenuators is less than a weight of an airframe of a similar aircraft without load attenuators. In another aspect, each load attenuator of the one or more load attenuators comprises a textile load attenuator comprising a fold of fabric sewn with stitching, wherein the stitching is configured to break and is configured to unfold in response to an impact. In another aspect, a stroke displacement of the load attenuators is 4 up to 60 centimeters.

In an embodiment, the disclosure comprises an apparatus comprising a float bag comprising an air bladder configured to inflate when an aircraft lands in the water, a girt coupled to the air bladder and configured to attach the air bladder to the aircraft via at least one airframe fitting, and a load attenuator coupled to the girt and configured to be positioned between the girt and the airframe fitting when the float bag is attached to the aircraft.

In an embodiment, the disclosure comprises an aircraft comprising an airframe comprising an airframe fitting, an engine positioned within the airframe, and landing gear coupled to the airframe, wherein the airframe fitting is configured to couple to a float bag via a load attenuator, wherein the airframe fitting is sized to allow the float bag to stay connected to the aircraft when the aircraft makes a water landing, and wherein the airframe has less mass than the mass that is needed in another airframe when there is no load attenuator positioned between the other airframe and the float bag.

In an embodiment, the disclosure comprises a method comprising selecting a sea state and an aircraft, wherein the aircraft comprises an airframe fitting, sizing at least one float bag for the aircraft, wherein the float bag is configured to keep the aircraft afloat and allow crew egress when the aircraft makes a water landing, and selecting a load attenuator to be positioned between the aircraft and the float bag, wherein the airframe fittings are configured to couple to the float bag via the load attenuator, wherein the airframe fitting is sized to allow the float bag to stay connected to the aircraft when the aircraft makes the water landing, and wherein the airframe has less mass than the mass that is needed in another airframe when there is no load attenuator positioned between the other airframe and the float bag.

BRIEF DESCRIPTION OF THE DRAWINGS

For a more complete understanding of the features and advantages of the present invention, reference is now made to the detailed description of the invention along with the accompanying figures and in which:

FIG. 9A shows the force on the left bag versus time, with a peak load of 3,750 lb (16,680 Newtons). FIG. 9B shows the force on the right bag versus time, with a peak load of 3,700 lb (16,460 Newtons).

DETAILED DESCRIPTION OF THE INVENTION

Figure 1:
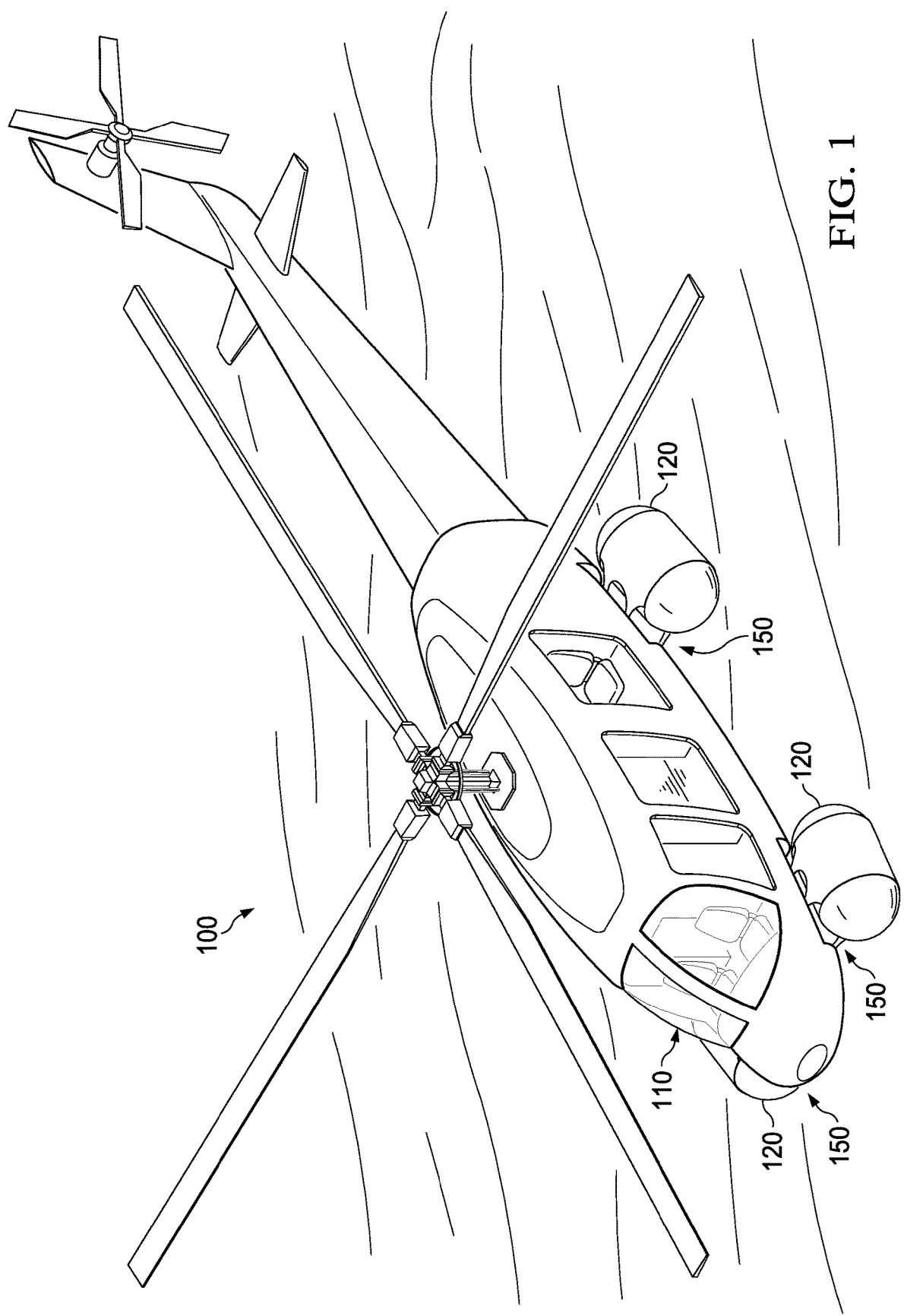
FIG. 1 is a perspective view of an embodiment an aircraft comprising float bags.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

Prior art uses girt attachments that transfer the loads from the floats as they interact with the water surface directly to the structural attachment fitting. While these girt attachment methods may have some degree of elasticity, they generally are made with low-elongation material and have little to no plastic elongation capability. Low-elongation elastic deformation, such as between 2 and 5 centimeters, is desirable to prevent the rotorcraft from resting lower in the water due to this elongation. Since the girts have no plasticity, the full load is transferred to the structure, which may result in rupture of the girt or failure of the fitting.

A problem can arise when the float system is inflated prior to contact with the water. In this case, a shock load can be introduced as the rotorcraft plunges into the water. Retention of the emergency flotation system is crucial for safety. Hence allowing a little deformation in the retention straps to reduce the magnitude of transient loads transmitted to the retention fittings enhances the potential for safe flotation.

The present invention introduces load-attenuators that can include stitch-rip (SR) or tear-webbing (TW) sized to minimize deformation while controlling the load transmitted to the airframe retention fittings. Non-limiting examples of load attenuators that can be used with the present invention include but are not limited to textile load, mechanical, frangible, stitch-rip, T-shaped, Z-shaped, or tear webbing load attenuators. These load-limiting devices are tuned to match the structural fitting sizing and thereby minimize deflection. It will be appreciated by those skilled in the art that other load-attenuator devices may be used and are not limited to SR and TW devices. These include attenuators in-line with the girt strap such as the SR and TW devices as well as load attenuators integrated into the airframe fitting structure.

One such load attenuator is a stitch-rip (SR) device that includes a piece of nylon webbing that is folded onto itself and bound by lock stitching thread stitching, that generally includes continuous sacrificial portions.

Another such load attenuator is a tear webbing (TW) device, which includes a pair of woven polyester webbings that are sinusoidally interwoven with sacrificial elements. The continuous tearing elements provide the load limiting, and are typically have less slip that SR devices and a higher specific energy absorption.

Aircraft may occasionally make emergency landings or be forced to ditch in bodies of water. Certain regulations may specify certain ditching certification requirements for emergency water landings to minimize the probability of immediate injury to or provide escape/egress provisions for the occupants of an aircraft. In order to allow occupants of the aircraft a better chance to escape after a water landing, flotation devices (e.g. float bags) may be installed on the aircraft. As used herein, the term float bag may refer to any flotation device used on an aircraft for water landings whether temporary (e.g. inflatable float bags) or permanent (e.g. pontoons or floats). The float bags may allow for the aircraft to remain sufficiently upright and in adequate trim to permit safe and orderly evacuation of all personal and passengers of the aircraft.

Float bags may be required for aircraft that operate over water. The float bags may be attached to the airframe using airframe fittings, and the float bags may be inflated prior to, simultaneous with, or subsequent to the aircraft making a water landing. The airframe may be designed to support the load experienced by the float bags during a water landing. In order to reduce the load transmitted to the airframe, a load attenuator may be installed between the float bag and the airframe. The load attenuator may reduce the load transmitted to the airframe and may therefore allow a lighter weight airframe (e.g. an airframe with less mass) and/or float bag supports to be used. In addition, the load attenuators may allow the aircraft to sit lower in the water, thereby lowering the center of gravity and reducing the possibility of the aircraft capsizing after a water landing.

Figure 2:
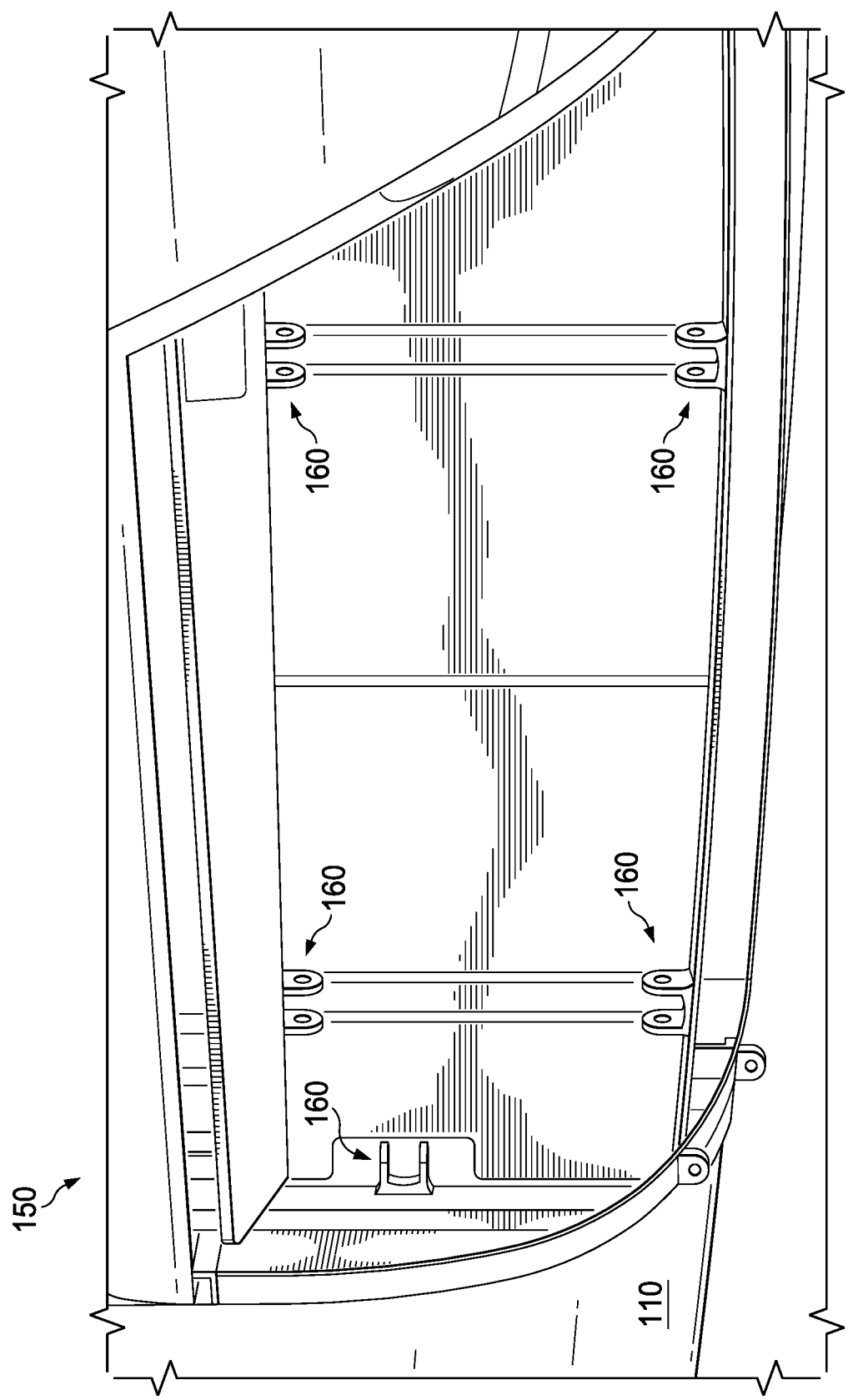
FIG. 2 is a perspective view of an aircraft float bag installation location.

FIG. 1 is a perspective view of an embodiment of an aircraft 100 comprising float bags 120. The aircraft 100 comprises an airframe 110 (e.g. fuselage) that may comprise an engine, transmission, avionics, main and tail rotors, tail boom, landing gear (e.g. fixed or retractable landing gear), etc. that allow the aircraft to be operated. The aircraft 100 may comprise one or more float bags 120. While four float bags 120 are depicted, any number of float bags 120 may be used depending upon the characteristics of the airframe 110 and/or the characteristics of the float bags 120. The float bags 120 may be coupled to the airframe 110 at float bag installation locations 150, an embodiment of which is shown in FIG. 2. It will be appreciated that the float bags 120 may be attached to the airframe 110 using any suitable connections that maintain the aircraft 100 in an orientation that permits safe egress of the occupants (e.g. passengers and flight crew) in the event of a water landing. The float bags 120 are typically attached to the airframe 110 in a compact or deflated state during ground and air operations (although an inflated configuration is included within the scope of this disclosure). The float bags 120 may automatically deploy if a water landing is detected by sensors on the aircraft 100 and/or the float bags 120. Alternatively, the flight crew may deploy or inflate the float bags 120 when needed. Finally, although a helicopter is illustrated in FIG. 1, the disclosed systems and methods may be applied to any type of aircraft, such as airplanes or tilt-rotor aircraft, as well as any other types of vehicles.

The airframe 110 may be manufactured such that it withstands the load placed on it when the aircraft 100 makes a water landing with the float bags 120 in either an inflated or a deflated state. In order to reduce the load placed on the airframe 110 during a water landing, a load attenuator may be installed between the float bags 120 and the airframe 110. For example, one end of a load attenuator may be coupled to the float bag 120 and a second end of the load attenuator may be coupled to the airframe fittings that are part of the airframe 110. In aircraft without load attenuators, the float bag peak retention load under probable water conditions (e.g. sea state 4 or sea state 6) is significantly high such that the airframe fittings may need to be enlarged to properly carry such a high load. Typically, aircraft without load attenuators may require a relatively heavy frame compared to the airframe 110, which comprises float bags 120 with load attenuators.

FIG. 2 is a perspective view of a float bag installation location 150. The float bag installation location 150 may be located on the outside of the airframe 110 (e.g. on the sides, front, back, or bottom, such as the keel boom, of the airframe 110, or on the tail boom), on the inside of the airframe 110 (e.g. on the floor of the airframe 110), or combinations thereof. In some embodiments, the float bag installation location 150 may be covered with a panel when the float bags 120 are not installed on the airframe 110 (e.g. to promote aerodynamic efficiency). In other embodiments, the float bag installation location 150 may comprise a cavity sized such that the float bags 120 are installed therein and an aerodynamic cover may be placed over the float bags 120. The aerodynamic cover may open or be disconnected from the airframe 110 upon deployment of the float bags 120. Alternatively, the float bags 120 may be aerodynamically shaped. In any of these embodiments, float bags 120 are not sufficiently constrained such that the float bags 120 are prevented from opening and/or deploying in the event of a water landing.

The float bag installation location 150 may comprise a plurality of airframe fittings 160. In FIG. 2, the float bag 120 has been removed to better illustrate the airframe fittings 160. The expected sea conditions, the aircraft size, as well as the specific type of float bag 120 may dictate the location and number of the airframe fittings 160. The airframe fittings 160 may be sized and/or otherwise configured to allow the float bag 120 girts (shown in FIG. 4) to be attached. The airframe fittings 160 may be a loop, stud, any other suitable attachment point, or combinations thereof. While five pairs of airframe fittings 160 are shown, any number of airframe fittings 160 may be used.

The airframe fittings 160 may be configured such that some airframe fittings 160 have differing functions than other airframe fittings 160. It should be understood that the primary responsibility of the airframe fittings 160 is to maintain connectivity between the airframe 110 and the float bags 120. However, some of the airframe fittings 160 may be further configured to support drag loads (e.g. aerodynamic drag forces during forward flight or water drag caused by the water acting on the float bags 120), other airframe fittings 160 may be further configured to support the weight of the float bags 120, and yet other airframe fittings 160 may be configured to keep the float bags 120 close to the airframe 110 once the float bags are deployed. Various types of such airframe fittings 160 may be used on the aircraft 100.

Figure 3:
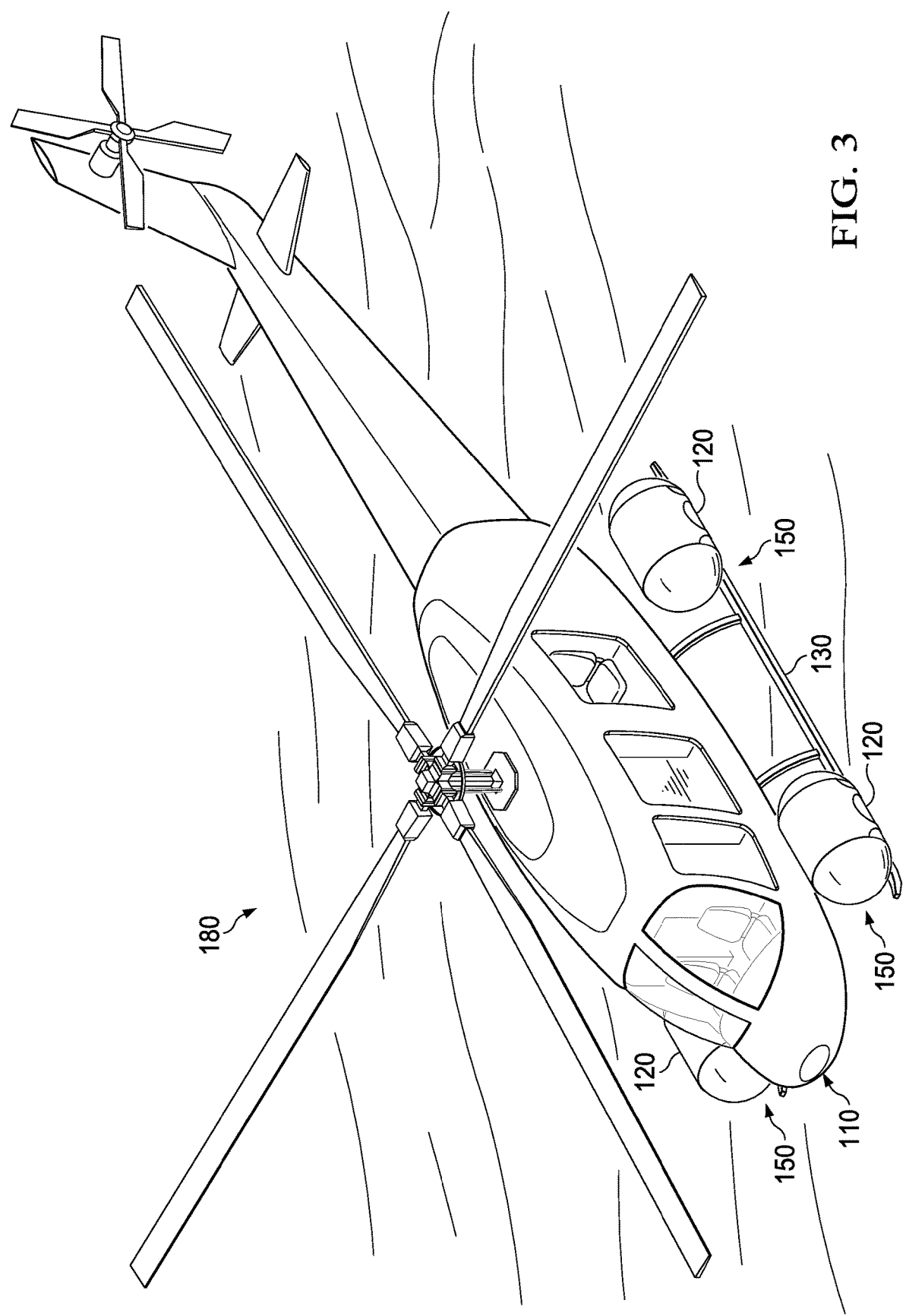
FIG. 3 is a perspective view of another embodiment an aircraft comprising float bags.

FIG. 3 is a perspective view of another embodiment of an aircraft 180 comprising float bags 120. The aircraft 180 is similar to the aircraft 100 described above, and thus only the differences are discussed herein. Unlike aircraft 100 which contains retractable landing gear, aircraft 180 comprises fixed landing gear 130 (e.g. skids). In FIG. 3, the float bags 120 are coupled to the landing gear 130, but in some instances the float bags 120 may be coupled to both the airframe 110 and the landing gear 130. For example, the float bags 120 may be coupled to both the airframe 110 and the landing gear 130 either separately (e.g. some float bags 120 coupled to the landing gear 130 and some float bags 120 coupled to the airframe 110) or in combination (e.g. at least one float bag 120 simultaneously coupled to the landing gear 130 and the airframe 110). Alternatively, the float bags 120 may be coupled to an intermediary surface or device that may be coupled to the airframe 110 (e.g. a pylon). As with the aircraft 100, the float bag installation locations 150 may be selected such that upon a water landing, the aircraft's 180 points of egress are above the expected waterline, thus minimizes buoyancy depth of the aircraft 180.

Figure 4:
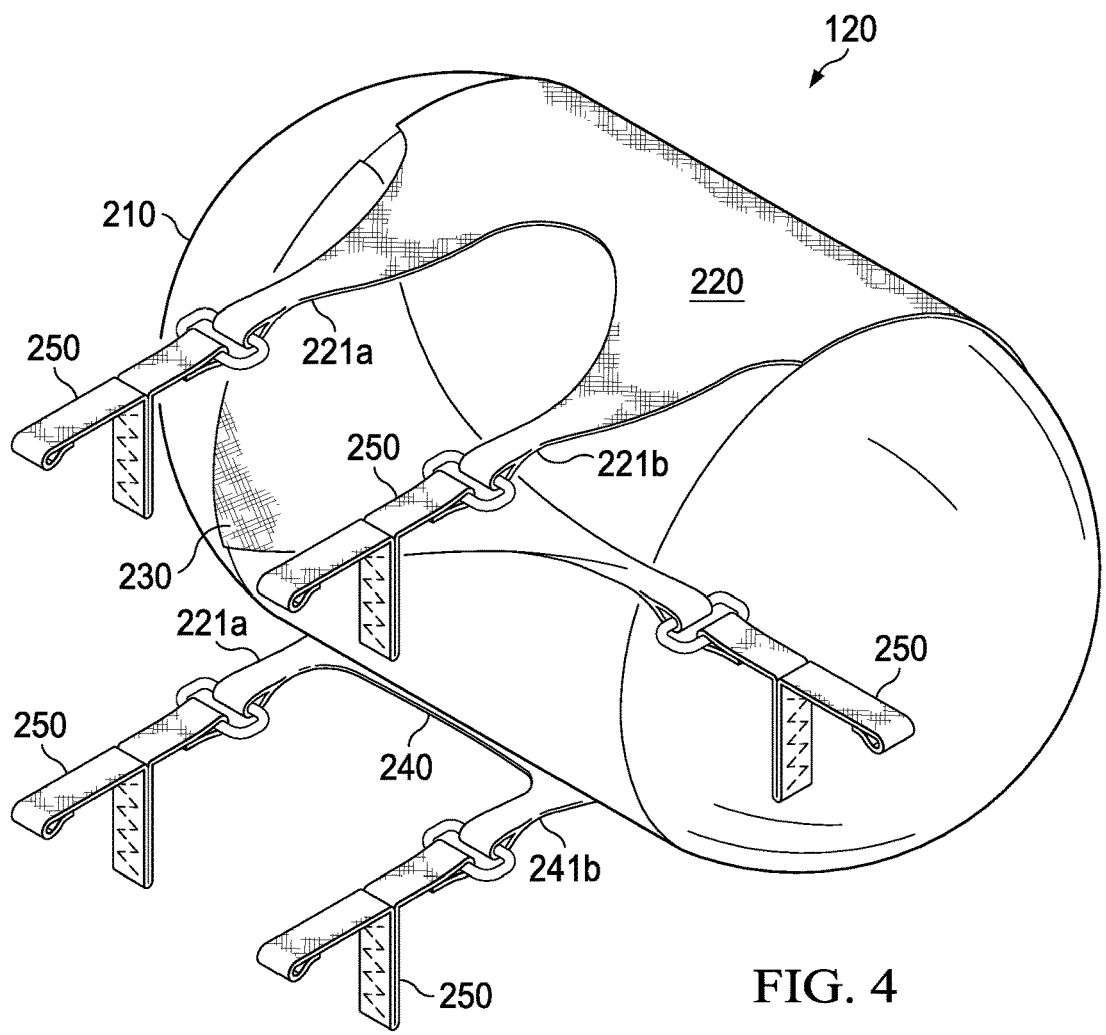
FIG. 4 is a perspective view of a float bag and the load attenuator.

FIG. 4 is a perspective view of a float bag 120. The float bag 120 may comprise an air bladder 210, an upper load girt 220, a lower load girt 240, a drag girt 230, and several load attenuators 250. The air bladder 210 may be any non-permeable material capable of containing air or other gasses and that is configured to provide bouncy for the airframe while in the water. The air bladder 210 may be divided into several air chambers, such that if one of the chambers is punctured, the float bag 120 retains buoyancy. The air bladder 210 may also comprise water sensors and compressed air (or other gas) tanks that allow the float bag 120 to deploy when a water landing occurs.

The upper load girt 220 may be attached to the air bladder 210 and may be configured to attach to the airframe (e.g. via the airframe fittings 160). The upper load girt 220 may be made of the same material as the air bladder 210, or any other material suitable for attaching the upper load girt 220 to the air bladder 210. The upper load girt 220 may be made of a material that is flexible such that the air bladder 210 and upper load girt 220 may be stored in a deflated state, e.g. in a storage container or within a cavity in the aircraft. Also, the upper load girt 220 is shown with two arms 221a, 221b, but may comprise any number of arms 221.

The lower load girt 240 may be attached to the air bladder 210 and may be configured to attach to the airframe (e.g. via the airframe fittings 160). The lower load girt 240 may be made of the same material as the air bladder 210, or any other material suitable for attaching the lower load girt 240 to the air bladder 210. The lower load girt 240 may be made of a material that is flexible such that the air bladder 210 and lower load girt 240 may be stored in a deflated state, e.g. in a storage container or within a cavity in the aircraft. Also, the lower load girt 240 is shown with two arms 241a, 241b, but may comprise any number of arms 241.

The drag girt 230 may be attached to the air bladder 210 and may be configured to attach to the airframe (e.g. via the airframe fittings 160). The drag girt 230 may be made of the same material as the air bladder 210, or any other material suitable for attaching the drag girt 230 to the air bladder 210. The drag girt 230 may be made of a material that is flexible such that the air bladder 210 and drag girt 230 may be stored in a deflated state, e.g. in a storage container or within a cavity in the aircraft. Also, the drag girt 230 is shown with one arm 231, but may comprise any number of arms 231.

Any number or all of the upper load girt 220, the lower load girt 240, and the drag girt 230 (collectively, girts) may comprise a load attenuator 250. As used herein, the term load attenuator may refer to any device that decreases a shock load on at least one end of the device, typically by mechanized deformation of the device. Load attenuator may also be referred to as a load limiter. The load attenuators 250 may be part of the girts (e.g. the girt arms) or may be an intermediary device positioned between the girts and the airframe. The load attenuators 250 are typically designed to mechanically deform but not disconnect two bodies (e.g. the airframe and the float bag) when a tensile force is applied to the load attenuator 250. By incorporating the load attenuators 250, the peak retention load of the float bags during a water ditching or water emergency landing may be greatly reduced relative to a similar situation where no load attenuator 250 is installed. For example and with reference to FIG. 7, the energy absorption can be increased in the case where a load attenuator is installed, because the stroking distance (e.g. distance over which a load is carried) may be increased, and thus the integrated area under the load-deflection curve 730 can be increased relative to the case where the load attenuator is not installed, curve 710.

Figure 5:
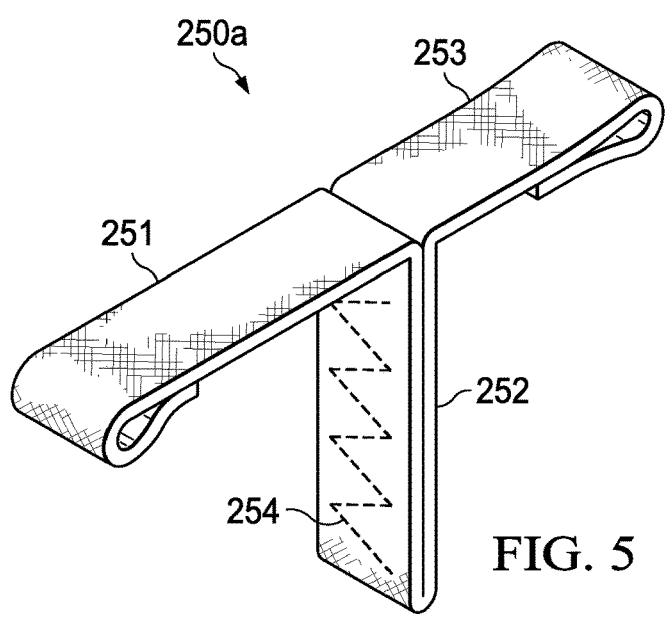
FIG. 5 is a perspective view of a textile load attenuator.

FIG. 5 is a perspective view of a textile load attenuator 250a. The textile load attenuator 250a may be any device that comprises a fabric body and a plurality of stiches in the fabric body that are configured to tear without compromising the fabric body when a tensile load is applied to the textile load attenuator 250a. The fabric in the textile load attenuator 250a may be selected to withstand saltwater environments and other environmental conditions that may be experienced in a water landing. Textile load attenuator 250a may have a lower strength limit defined by the stitch strength (e.g. a load under which the stiches will not break) and an upper strength limit defined by the load limit of the fabric (e.g. a load that exceeds the tensile strength of the fabric). In some embodiments, the stitch thread and/or stitch density may be consistent throughout the load attenuator 250a such that the load required to break the stitches is consistent as the stitches tear or become undone. Alternatively, the stitch thread and/or stitch density may be varied throughout the load attenuator 250a such that the load required to break the stitches varies (e.g. increases) as the stitches tear or become undone.

The textile load attenuator 250a illustrated in FIG. 5 comprises a single length of fabric comprising a first arm 251, a fold 252, and a second arm 253. The fold 252 comprises a plurality of stitches 254 sewn into the fold 252. When a load is applied to the textile load attenuator 250a and the stitches tear, a straight piece of fabric remains. Although the load attenuator 250a in FIG. 5 is shown in a "T" configuration, other configurations are also available. For example, a "Z" configuration could be created by moving the fold 252 up to the first arm 251 and passing the stitches 254 through all three layers of fabric. In another example, a "ZS" configuration could be made by creating a "Z" configuration next to a mirror image of the "Z" configuration. Alternatively, the load attenuator 250a could comprise multiple folds 252, or perhaps a combination of different folds 252 (e.g. one "T" configuration and one "Z" configuration).

The textile load attenuator 250a illustrated in FIG. 5 but modified to be a tear-fabric configuration rather than a tear-webbing configuration with stitches. The tear-fabric configuration is comprised of a length of fabric folds 252 having two sides woven together such that when the two sides are pulled apart, the weaving elongates and tears. In such an embodiment, the fabric layers will tear apart (and thereby attenuate the load) to a point, after which the fabric will maintain its structural integrity. This is similar to the embodiment described above where the stitch tear to a point (to attenuate the load), and then the fabric maintains its structural integrity.

Figure 6:
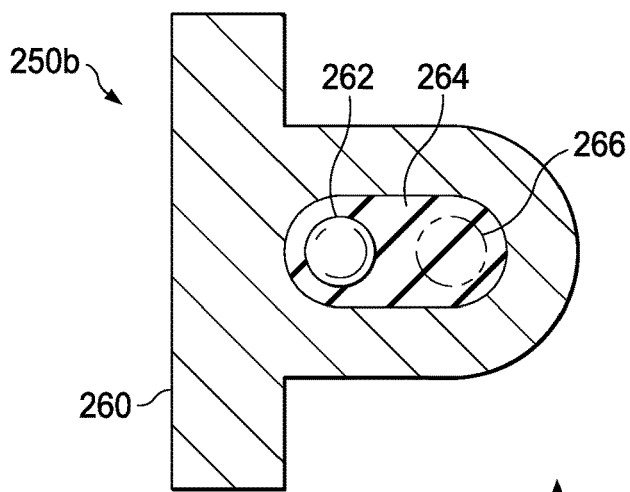
FIG. 6 is a cross-sectional view of a frangible load attenuator.

FIG. 6 is a perspective view of a mechanical load attenuator 250*b*. A mechanical load attenuator may be any device configured to mechanically deform when a tensile load is applied thereto, but will not mechanically fail to the point where the two ends of the attenuator to which the tensile load is applied become separated from each other. In the embodiment illustrated in FIG. 6, the mechanical load attenuator 250*b* is a frangible load attenuator. A frangible load attenuator may be any device that comprises a body that is designed not to break under the tensile load and an internal structure that is designed to break under the same tensile load. The materials the mechanical load attenuator 250*b* may be selected to withstand saltwater environments and other environmental conditions that may be experienced in a water landing. The mechanical load attenuator 250*b* may have a lower strength limit defined by the internal material strength (e.g. a load under which the internal material will not deform) and an upper strength limit defined by the load limit of the body material (e.g. a load that exceeds the tensile strength of the body material). In some embodiments, the internal material may be consistent throughout the load attenuator 250*b* such that the load required to deform the internal material is consistent as the internal material deforms. Alternatively, the internal material may be varied throughout the load attenuator 250*b* such that the load required to deform the internal material varies (e.g. increases) as internal material is deformed.

The mechanical load attenuator 250*b* illustrated in FIG. 6 comprises a non-frangible casing 260 surrounding a frangible support material 264. The frangible support material 264 may have a lower strength (e.g. a lower shear, tensile, or compressive strength) than the non-frangible casing 260 material. For example, the frangible support material 264 may be aluminum or plastic, while the non-frangible casing 260 material may be steel. A non-frangible fastener 262 may be placed in the frangible support material 264. The non-frangible fastener 262 may shear the frangible support material 264 upon experiencing a sufficient load. Upon experiencing an impact with enough force to shear the frangible support material 264, the non-frangible fastener 262 may move to the position indicated at index 266.

Several other examples of mechanical load attenuators exist. For example, the mechanical load attenuator may comprise a pre-twisted length of material (e.g. metal) that untwists when a tensile load is applied thereto. Alternatively, the mechanical load attenuator may comprise a convoluted piece of material (e.g. metal) that straightens when a tensile load is applied thereto. Further in the alternative, the mechanical load attenuator may include a torsion bar that twists when a load is applied thereto. In addition, the mechanical load attenuator may comprise a chamber that is configured to compress when a tensile load is applied thereto (e.g. where the chamber comprises two plates at a proximate end and a distal end, the distal plate is connected to the proximate end and the proximate plate is connected to the distal end. In such a case, the chamber may comprise any suitable compression load attenuator, such as a beam convoluted in cross-section that is forced through a straightener when a force is applied thereto. Such technologies are used in highway guardrails. Furthermore, the mechanical load attenuator may comprise a spring that stretches when a tensile load is applied thereto, but may optionally return to at least part of its original length. Doing so may be desirable because it may bring the float bags closer to the aircraft after a water landing and improve stability and/or raise the aircraft in the water, and thus controlling the buoyancy depth of the aircraft.

Figure 7:
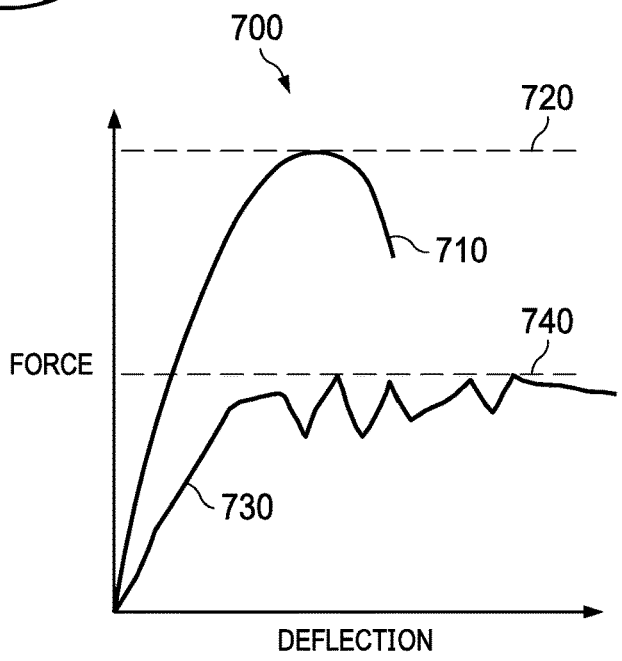
FIG. 7 is a graph of forces experienced with and without load attenuators installed.

FIG. 7 is a graph 700 of the forces experienced with and without load attenuators installed. Curve 710 is a representation of the forces encountered during a water landing on an aircraft with float bags installed without load attenuators. Curve 730 is a representation of the forces encountered during a water landing on an aircraft with float bags installed with load attenuators. The maximum force experienced without load attenuators 720 may be significantly greater than the maximum force experienced with load attenuators 740. As described above, the load attenuators may function in a progressive failure fashion which may result in limiting the peak load while maintaining a constant load 740. The resulting energy absorption, which is the integrated area under the load-deflection curve, is equal or greater with the load-attenuators installed. It will be appreciated that the load 740 is not required to be constant but can increase or decrease to meet design requirements. Thus, while the graph 700 shows a horizontal line for maximum force experienced with load attenuators 740, the maximum force may in some embodiments vary with deflection (e.g. linear distance) based upon the configuration of a load attenuator used in a progressive failure fashion.

Figure 8:
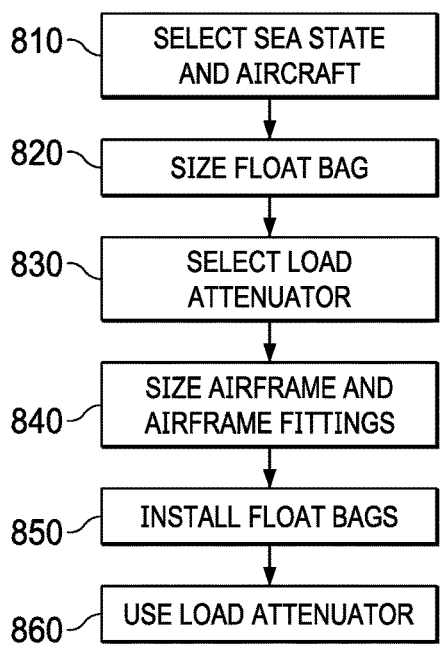
FIG. 8 is a flowchart of a method for selecting and using a float bag comprising a load attenuator.

FIG. 8 is a flowchart of a method 800 for providing and using the float bag with load attenuators as described herein. Steps 810-840 generally are referred to as providing the float bag with load attenuators, while steps 850 and 860 describe the use of the float bags with load attenuators. The method 800 may begin at step 810 by selecting a sea state and an aircraft. Sea state conditions are defined by various organizations and scales (e.g. the world meteorological organization, the Douglas Sea Scale, or the Beaufort scale), and various type of aircraft (e.g. helicopters, tiltrotors, airplanes, etc.) are known. The sea state and aircraft are selected so that the loads applied to the float bags can be calculated based on the expected airspeeds, aircraft weights, wave heights, wave configurations, and so forth. For example, the expected loads that the float bag may encounter may be calculated, and then a safety factor may be applied to the expected loads. The method 800 may continue at step 820 by sizing at least one float bag suitable for the aircraft and sea state. The float bags may be sized based on the sea conditions and aircraft weight, and may include a safety factor (e.g. float bags sized for twice needed size).

The method 800 may continue at step 830 where the load attenuators are selected. The load attenuators may be selected based on the expected loads that the float bag will encounter. The type and size of load attenuator selected for use in certain embodiments may depend on one or more of the following factors: characteristics of the aircraft, characteristics of the float bags, and probable water conditions upon landing. The water conditions may be based on various sea states defined by the world meteorological organization, the Douglas Sea Scale, or the Beaufort scale. Certain regulations may require that the aircraft be able to withstand a water landing in certain sea states, for example a sea state 4 or sea state 6. For example, in some embodiments using four float bags, load attenuators may be selected based on the aircraft landing in a body of water under sea state 4 conditions, the selected load attenuators may be able to withstand 3,500 pounds of force without failing (e.g. they attenuate at less than 3,500 pounds, but do not decouple the float bag from the aircraft). Using the same aircraft and float bag characteristics, with an expected sea state of 6, load attenuators may be selected with a value of 6,000 pounds.

The method 800 may continue at step 840 where the airframe and airframe fittings are sized. The load attenuators allow the airframe and/or airframe fittings to be smaller than the airframe and/or airframe fittings used on aircraft with no load attenuators on the float bags. For example, the load attenuators may allow the airframe and/or airframe fittings to be about 30%, about 40% or about 50% smaller than the airframe and/or airframe fittings used on aircraft with no load attenuators on the float bags.

The method 800 may continue at step 850 by installing the float bags with load attenuators on the aircraft. For example, the float bags may be attached to the load attenuators, and the load attenuators may be attached to the airframe fittings. Installing a load attenuator between the float bags and the airframe may allow a lighter weight airframe (e.g. an airframe with less mass) to be selected for use on the aircraft. Finally, the load attenuators are used at step 860 when an aircraft makes a water landing. Specifically, the load attenuators may deform as described above. Additionally, the load attenuator may allow the aircraft to sit lower in the water and consequently decrease the chance of the aircraft capsizing in higher sea states. In the case of a helicopter, a large overhead mass of equipment may be present, for example, the transmission, rotor, and engines may all be located at the top of the aircraft. Thus, lowering the entire aircraft will decrease the center of gravity and increase flotation stability.

Figure 9A:
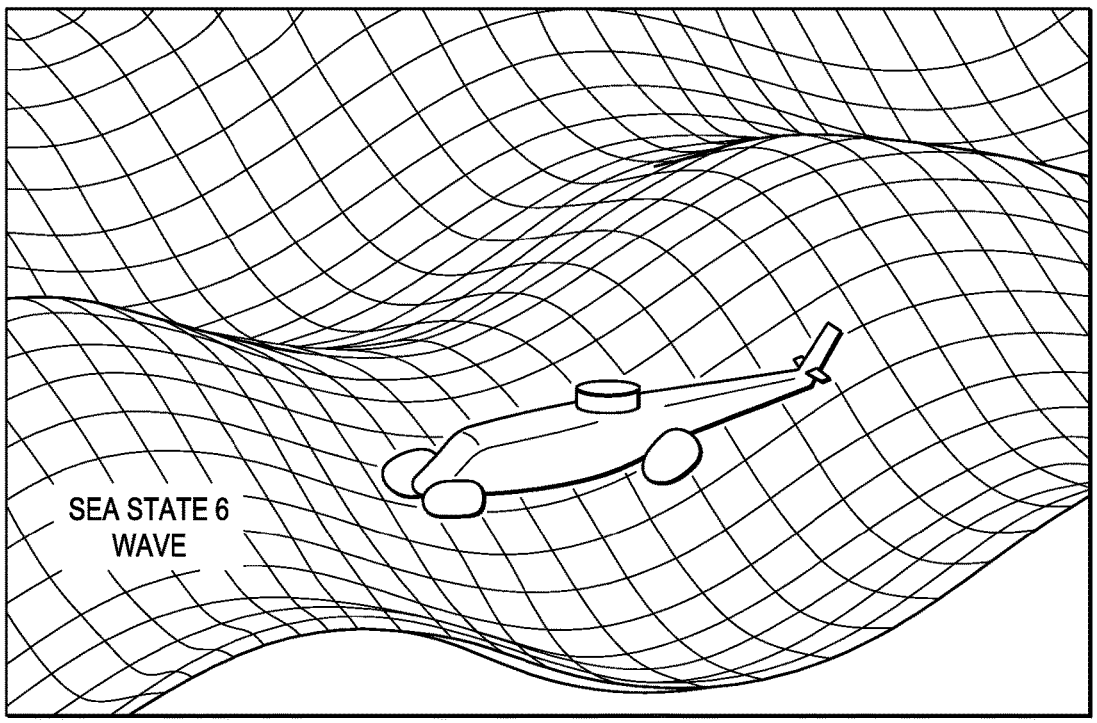
FIGS. 9A and 9B show a representative load time-history of a float bag fitting loads when the floats are deployed prior to water entry at Sea State 6.
Figure 9A:
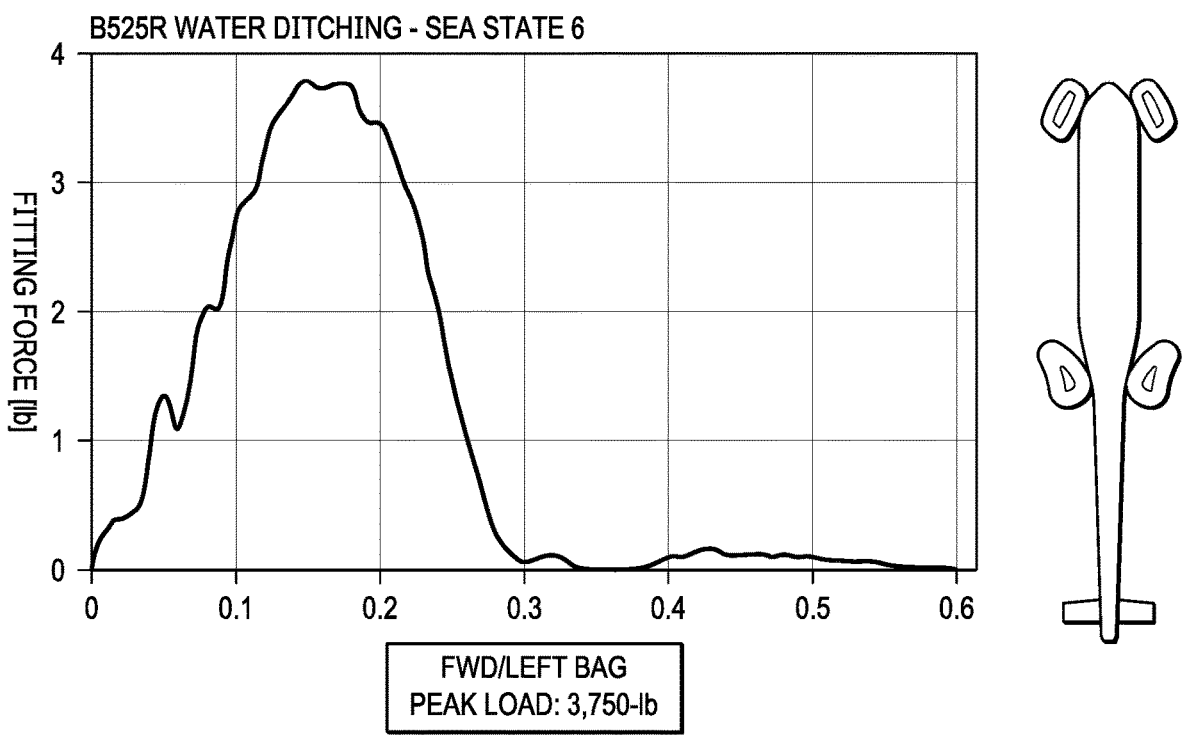
Figure 9B:
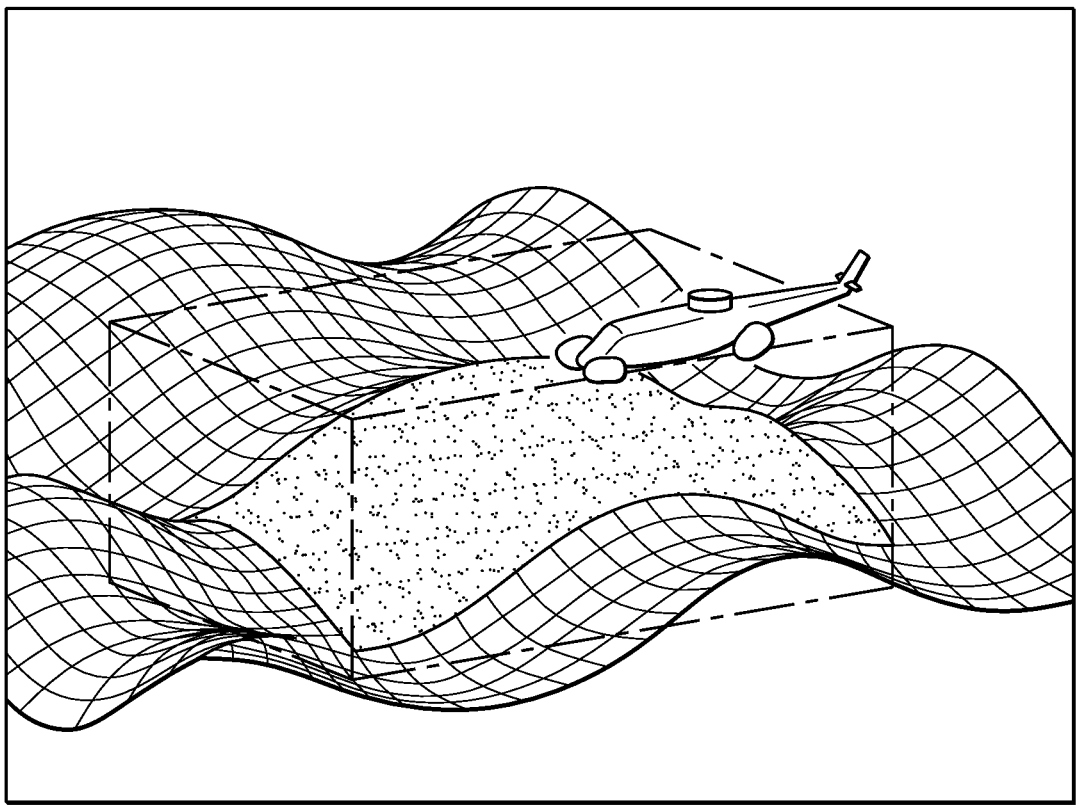
Figure 9B:
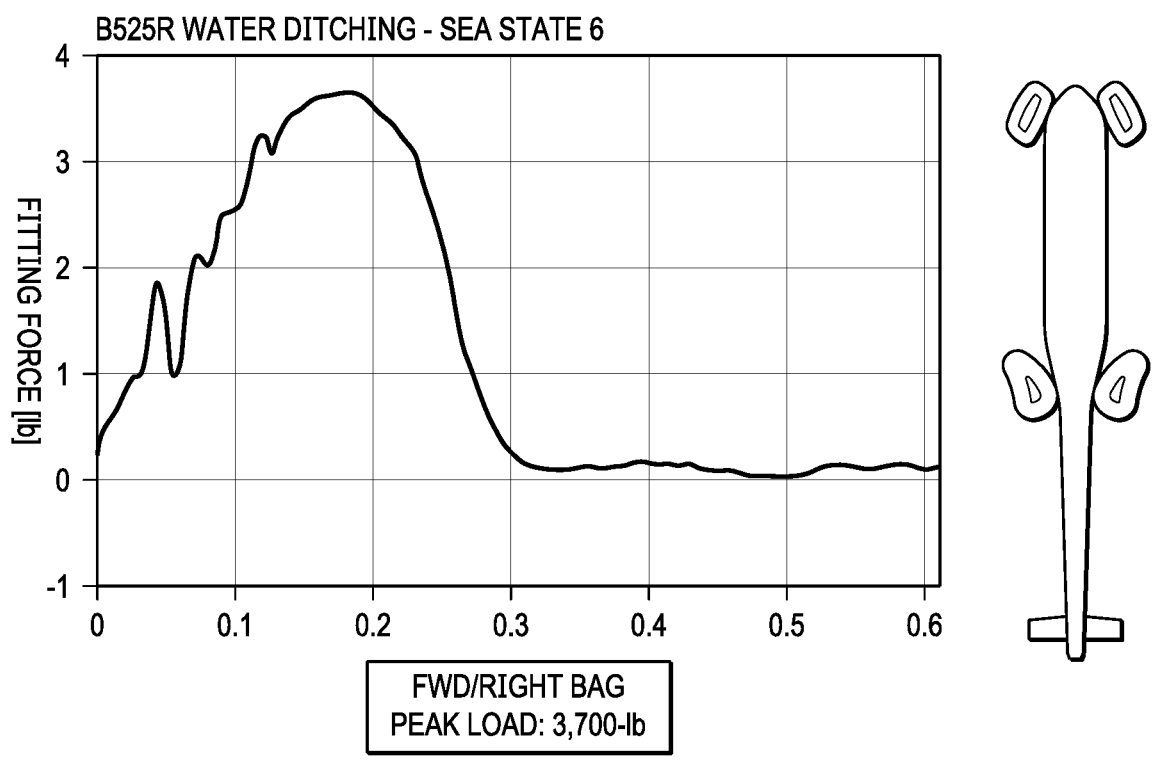

FIGS. 9A and 9B show a representative load time-history of a float bag fitting loads when the floats are deployed prior to water entry at Sea State 6 of the prior art. FIG. 9A shows the force on the left bag versus time, with a peak load of 3,750 lb (16,680 Newtons). FIG. 9B shows the force on the right bag versus time, with a peak load of 3,700 lb (16,460 Newtons).

Figure 10:
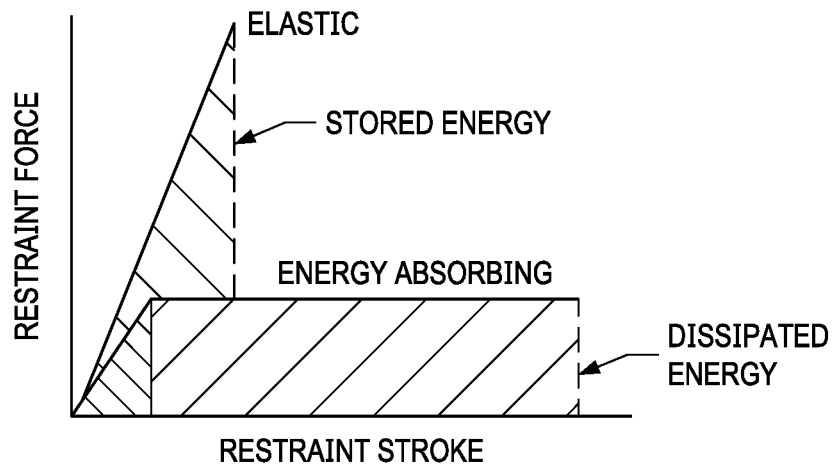
FIG. 10 is a graph with a comparison of force-stroke response to elastic (prior art) and energy absorbing restraints.
Figure 11:
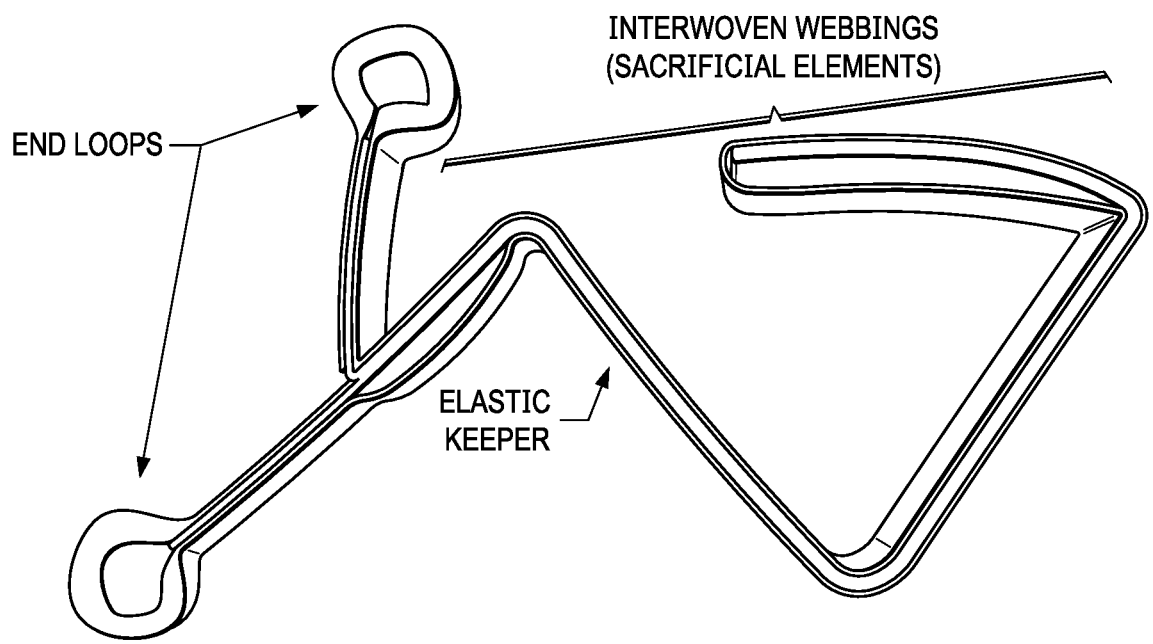
FIG. 11 shows an un-activated polyester tear webbing (TW) device showing the end loops for attachment of the load attenuator to the airframe, the interwoven webbing or sacrificial elements, and an elastic keeper.
Figure 12:
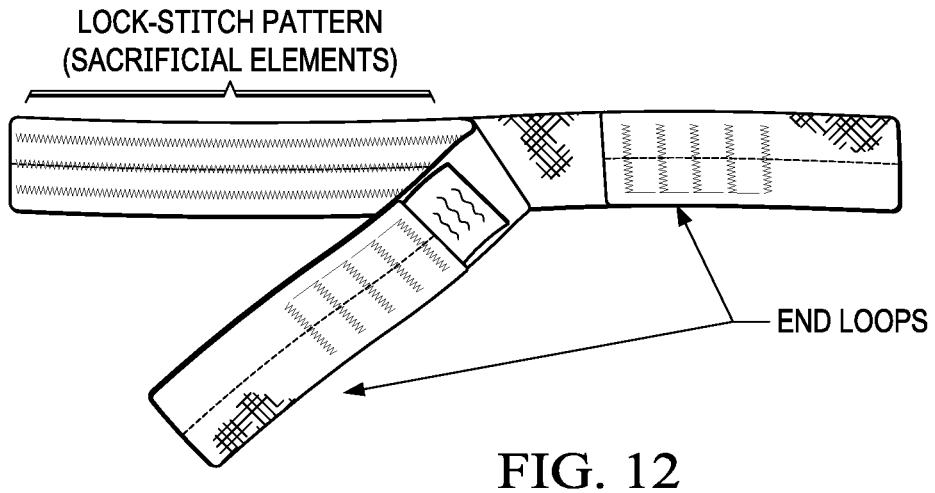
FIG. 12 shows an un-activated stitch-ripping (SR) device that shows the end loops for attachment of the load attenuator to the airframe, and the lock-stitch pattern or sacrificial elements.

FIG. 10 is a graph with a comparison of force-stroke response to elastic (prior art) and energy absorbing restraints. FIG. 11 shows an un-activated polyester tear webbing (TW) device showing the end loops for attachment of the load attenuator to the airframe, the interwoven webbing or sacrificial elements, and an elastic keeper. FIG. 12 shows an un-activated stitch-ripping (SR) device that shows the end loops for attachment of the load attenuator to the airframe, and the lock-stitch pattern or sacrificial elements.

Figure 13:
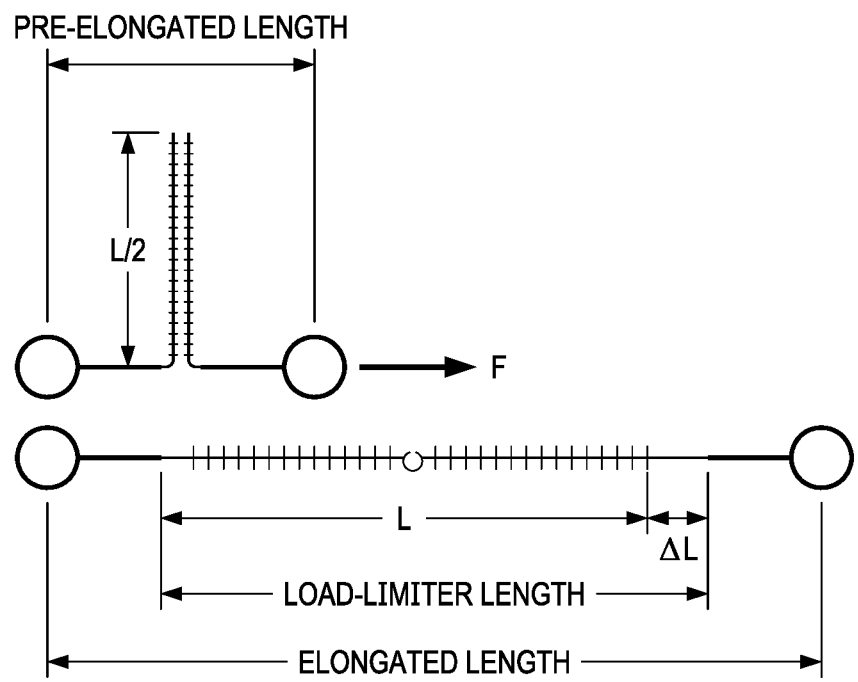
FIG. 13 shows a schematic for the calculation of the total length of a device during dynamic testing.

FIG. 13 shows a schematic for the calculation of the total length of a device during dynamic testing, which shows the initial pre-elongated length prior to activating the load attenuator, and the load-limiter length, and the elongated length. FIG. 13 includes the calculation of the stroke displacement, that is, the total length of a load attenuator device during dynamic testing. As can be seen in FIG. 13, the "load-limiter length" refers to the length $L_{total}$, wherein the stroke displacement of the one or more load attenuators is from 4 to 60 centimeters.

$$L_{total} = L + \Delta L = L\left(1 + \frac{F}{EA}\right)$$

As shown in FIG. 13, the stroke displacement is the difference between Pre-Elongated Length and Elongated Length.

Figure 14:
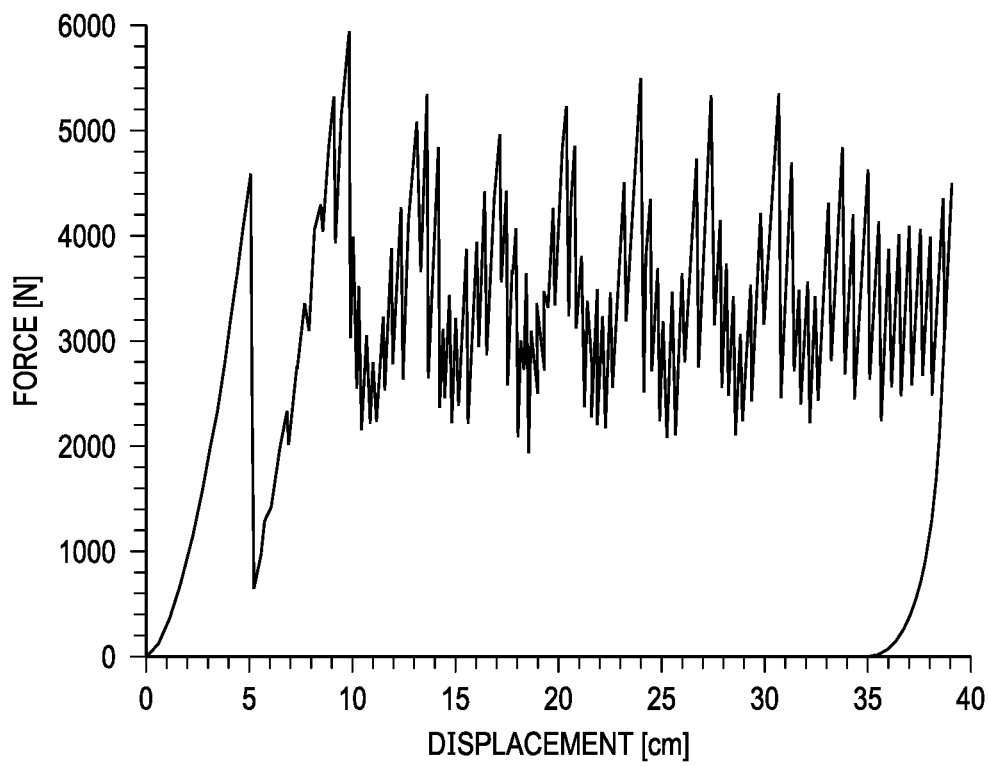
FIG. 14 shows a quasi-static result of using a tear webbing (TW) device.

FIG. 14 shows a quasi-static result of using a tear webbing (TW) device of the present invention, in which the force ranges from as high as 6,000 Newtons to as low as 1,000 Newtons (with an average of 2000 to 5000 Newtons), however, though the displacement is shown to between 5 and 40 centimeters when exposed to 3,500 pounds of force, in application, the load-limiter would not be expected to displace more than 10 to 15 centimeters before the impact energy is dissipated.

Figure 15:
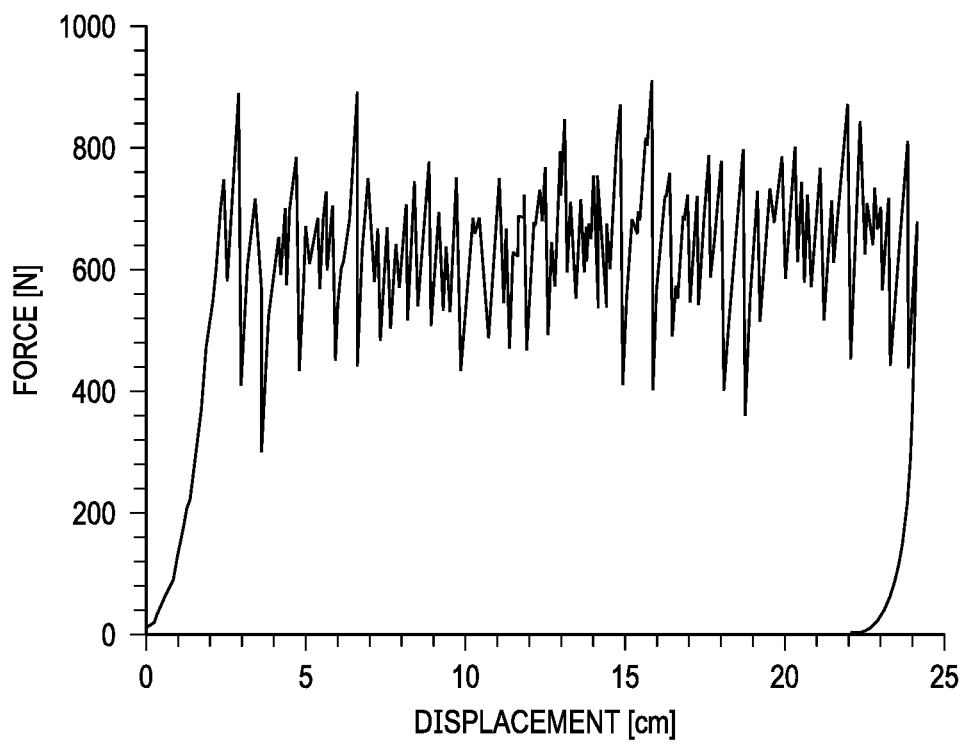
FIG. 15 shows a quasi-static result of using a stitch-ripping (SR) device.

FIG. 15 shows a quasi-static result of using a stitch-ripping (SR) device, in which the force is between 400 and 900 Newtons (with an average between 500 and 750 Newtons) with a displacement of between 3 and 25 centimeters when exposed to 3,500 Newtons of force. Again, in application, the load-limiter would not be expected to displace more than 10 to 15 centimeters before the impact energy is dissipated. As such, the present invention uses load-attenuators, such as stitch-rip (SR) or tear-webbing (TW) attenuators, sized to minimize deformation while controlling the load transmitted to the airframe retention fittings. These load-limiting devices are tuned to match the structural fitting sizing and thereby minimize deflection during use. The low-elongation elastic deformation of between 3 and 40 centimeters prevents the rotorcraft from resting lower in the water due to this stretch. In this embodiment, a maximum force on the aircraft upon impact is between 500 and 7,500, 600 to 6,000, 750 to 5,000, 1,000 to 5,000, 2,000 to 5,000, 500 to 750, 500 to 1,000, 500 to 1,500, or 2,000 to 6,000 Newtons, however, the skilled artisan will recognize that the maximum force may be higher or lower depending on the mass of the aircraft, the size and strength of the retention structure, the sea conditions, speed during deployment, etc. The length of the elongation should be selected to minimize buoyancy depth of the aircraft, for example, the elongation can be 2, 4, 5, 7, 8, 10, 12, 15, 18, 20, 25, 30, 35, 40, 50, 55, 60, 70, 75 centimeters, with typical ranges being between 4 to 60, 5 to 50, 10 to 40, or 20 to 30 centimeters. As used herein, the phrase "to minimize buoyancy depth of the aircraft" refers to a water level that is about floor level or slightly above (i.e., wet feet—but plenty of breathable air and ease of emergency evacuation into rafts) as the aircraft will generally be buoyantly more stable if it sinks a little in the water, as will be recognized by the skilled artisan.

Further, as relates to buoyancy depth, this depth is directly related to girt displacement and the load-limiter length. The purpose for controlling the length of the load attenuators during any immersion (i.e., impact) is for energy to be arrested within about 25 cm (10 inches) and preferably less. This load limiter length allows the aircraft to be about a foot into the water in relation to the displaced float. Having additional "tear" distance on the load-attenuator is preferable for circumstances in which there is mis-timing and/or mis-placement contact upon the wave (i.e., hitting the front of the approaching wave instead of just after the top of the wave). This is because pilots fly into the wind whenever possible. Waves almost always are moving in the direction of the wind. Hence when ditching, the wave velocity is towards the aircraft (not beneficial), so in high sea states (large waves), the pilot attempts to touchdown on the top of the wave or just slightly behind it.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. An aircraft flotation device comprising:
an air bladder in a deflated state configured to be attached to an aircraft airframe, the air bladder configured to inflate automatically in response to an impact of the aircraft flotation device with water;
one or more sensors disposed on the aircraft or the air bladder and configured to detect an impact of the aircraft with water;
one or more girts coupled to the air bladder; and
one or more load attenuators having a first and a second end, wherein a first end of the one or more load attenuators is coupled to the one or more girts coupled to the air bladder, and the second end of the one or more load attenuators is attached to the aircraft airframe, wherein the one or more load attenuators are configured to mechanically deform in a progressive failure fashion from a first effective length to a second effective length greater than the first effective length in response to an applied tensile load between the air bladder and the aircraft airframe, wherein the one or more load attenuators are selected to reduce a force and a total length minimizes a buoyancy depth of the aircraft such that a water level is at floor level or slightly above floor level, and wherein the one or more load attenuators comprise a Z-shaped textile load attenuator.

2. The aircraft flotation device of claim 1, wherein each of the one or more load attenuators comprises a textile load attenuator comprising a fold of fabric sewn with stitching, wherein the stitching is configured to break and is configured to unfold in response to the impact.

3. The aircraft flotation device of claim 1, wherein a stroke displacement of the one or more load attenuators is from 4 to 60 centimeters.

4. The aircraft flotation device of claim 1, wherein the one or more load attenuators comprise a frangible load attenuator comprising frangible material and non-frangible material, wherein the non-frangible material is configured to shear the frangible material in response to the impact.

5. The aircraft flotation device of claim 1, wherein the one or more load attenuators comprise a mechanical load attenuator.

6. The aircraft flotation device of claim 1, wherein the air bladder is configured to attach to the aircraft airframe and to a landing gear.

7. An apparatus comprising:
a float bag comprising an air bladder configured to inflate automatically when an aircraft impacts with water;
one or more sensors disposed on the aircraft or the float bag and configured to detect an impact of the aircraft with water;
one or more girts coupled to the air bladder and configured to attach the air bladder to the aircraft via at least one airframe fitting; and
one or more load attenuators coupled to the one or more girts and configured to be positioned between the one or more girts and the airframe fitting when the float bag is attached to the aircraft, wherein the one or more load attenuators are configured to mechanically deform in a progressive failure fashion from a first effective length to a second effective length greater than the first effective length in response to an applied tensile load on the load attenuators coupled to the one or more girts and the aircraft, wherein the load attenuators are selected to reduce a force with a total length that minimizes a buoyancy depth of the aircraft such that a water level is at floor level or slightly above floor level, and wherein the one or more load attenuators comprise a T-shaped textile load attenuator.

8. The apparatus of claim 7 wherein the one or more load attenuators comprise a textile load attenuator comprising a fold of fabric sewn with stitching, wherein the stitching is configured to break and is configured to unfold in response to an impact.

9. The apparatus of claim 7, wherein a stroke displacement of the one or more load attenuators is from 4 to 60 centimeters.

10. The apparatus of claim 7, wherein the one or more load attenuators comprise a load attenuator comprising a frangible load attenuator comprising frangible material and non-frangible material, wherein the non-frangible material is configured to shear the frangible material in response to an impact.

11. The apparatus of claim 7, wherein the one or more load attenuators comprise a mechanical load attenuator.

12. The apparatus of claim 7, wherein the float bag is configured to attach to the at least one airframe fitting and to a landing gear.

* * * * *